Oct. 13, 1959   F. K. H. NALLINGER ET AL   2,908,341
WHEEL SUSPENSION SYSTEM
Filed Dec. 14, 1954   2 Sheets-Sheet 1
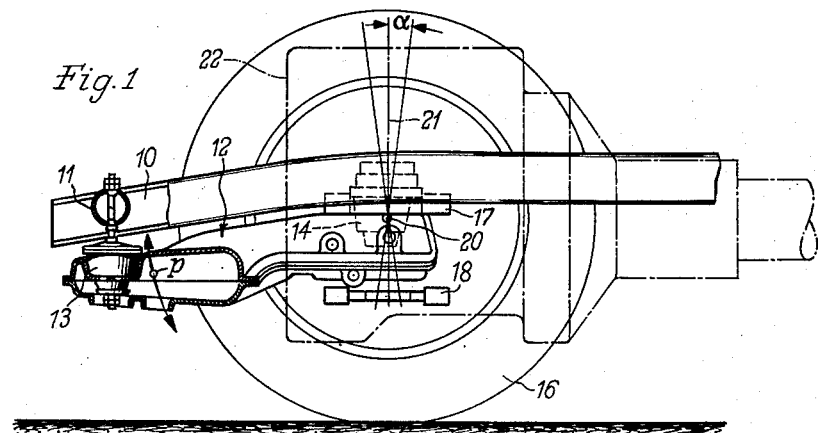
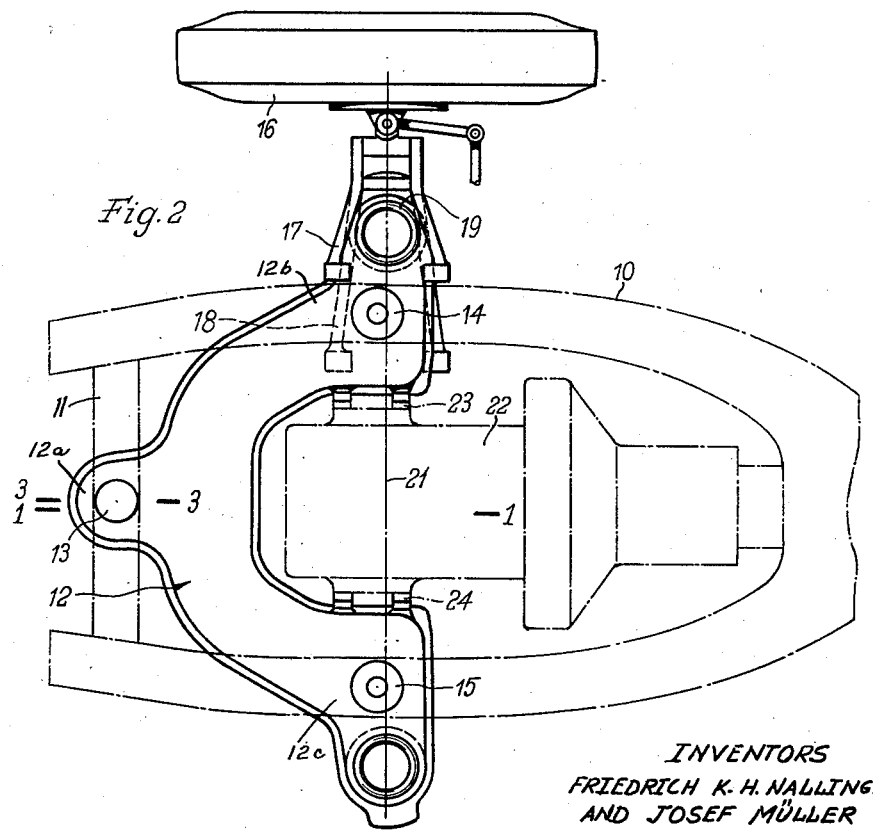
INVENTORS
FRIEDRICH K. H. NALLINGER
AND JOSEF MÜLLER
BY Dicke and Craig.
ATTORNEYS, Oct. 13, 1959  F. K. H. NALLINGER ET AL  2,908,341
WHEEL SUSPENSION SYSTEM Filed Dec. 14, 1954  2 Sheets-Sheet 2

INVENTORS
FRIEDRICH K. H. NALLINGER
AND JOSEF MÜLLER
BY Dicke and Craig
ATTORNEYS.

United States Patent Office 2,908,341
Patented Oct. 13, 1959

2,908,341

WHEEL SUSPENSION SYSTEM

Friedrich K. H. Nallinger and Josef Müller, Stuttgart, Germany, assignors to Daimler-Benz Aktiengesellschaft, Stuttgart-Unterturkheim, Germany Application December 14, 1954, Serial No. 475,058

Claims priority, application Germany December 14, 1953

8 Claims. (Cl. 180—64)

The present invention relates to improvements in auxiliary frames or crossbars for carrying the wheel suspension and supporting elements, as well as, if desired, the engine or driving unit of a motor vehicle, and to a resilient mounting for such auxiliary frame or crossbar.

It is the primary purpose of such auxiliary frame or crossbar to facilitate the separate assembly of the entire axle unit including the wheel suspension and supporting elements, and preferably also the engine, independently of the automobile superstructure, such as the chassis frame or vehicle body. Such auxiliary frame has the further purpose of furnishing a resilient connection between the wheel suspension or the engine or driving unit, on the one hand, and the frame or body of the automobile, on the other.

It is one of the objects of the present invention to provide an auxiliary frame or crossbar which complies with the above requirements and also furnishes a means for adjusting the wheel suspension, and more specifically the caster of the wheels in the forward and rearward directions.

Another object of the present invention is to provide means for safely taking up the torsional moments acting upon the auxiliary frame as well as for insuring a safe, simple, and accurate adjustment thereof.

A further object of the present invention is to provide a mechanism which permits such adjustment also to be carried out in a completely assembled vehicle.

An important feature of the present invention resides in mounting the auxiliary frame within two separate transverse planes spaced from each other in the longitudinal direction of the vehicle, one of which substantially coincides with the central axis of the wheels while the other takes up the torsional moments occurring about such axis, and further in the possibility of adjusting the mounting elements in a vertical direction within the transverse plane more remote from the central wheel axes, for example, for adjusting the caster of the wheels in a forward or rearward direction.

Another important object of the present invention is to provide an improved resilient mounting by means of rubber cushions, particularly for such auxiliary frame, so that while insuring a safe support of such frame within two transverse planes spaced from each other, and while taking up the torsional moments acting about one transverse axis, the rubber cushions may still be relatively soft, and may be increasingly softer the larger the distance between the two transverse planes or the length of the leverage for supporting the torsional moments on the main frame or car body.

Another feature of the present invention for accomplishing this object resides in providing the transverse plane within which the auxiliary frame is mounted at one end so as to coincide with that passing through the central axis of the wheels, and in providing the adjusting means of the auxiliary frame within the transverse plane in which the auxiliary frame is mounted at the other end. Such a construction permits an adjustment which is extremely accurate and reliable, and may be carried out with very little effort. It also has the advantage that when carrying out such adjustment, the wheel suspension is only turned about a transverse axis of the vehicle, and does not need to be raised or lowered in a vertical direction or only to an insignificant extent.

The elastic mounting of the auxiliary frame according to the invention has the further advantage that separate joints for pivoting the auxiliary frame relative to the main frame will not be required since the relative movements between such auxiliary frame or support and the superstructure of the vehicle formed, for example, by the main frame or vehicle body may be easily taken up by the rubber cushions as provided according to the invention.

Still another object of the invention resides in the provision of a cushion design, the resilience of which increases or decreases progressively in accordance with the pressure exerted thereon, or which may be limited to a certain degree.

Further objects, features, and advantages of the present invention will appear from the following detailed description of several embodiments of the invention and the accompanying drawings, in which Fig. 1 shows a side view partly in section of the front part of an automobile frame provided with an auxiliary frame or crossbar for supporting the engine;

Fig. 2 shows a plan view thereof;

Figure 3:
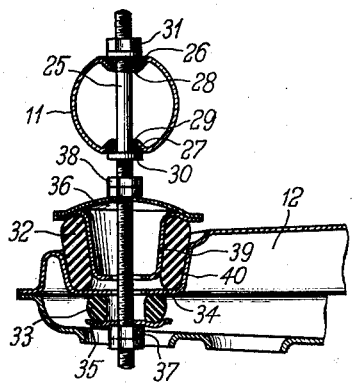
Fig. 3 shows an enlarged vertical section through the front suspension of the auxiliary frame shown in Fig. 1.

Referring to the drawings, Figs. 1 and 2 show the long channel bars 10 of the superstructure formed, for example, by the chassis frame of an automobile, for example, of the bifurcated type, with a cross member 11 connecting the bars 10 near the front ends thereof. An auxiliary frame or crossbar 12 of substantially U shape formed by an essentially transversely extending center portion 12a and two side portions 12b and 12c extending substantially in the longitudinal direction of the vehicle with further lateral projections at the rear ends of the portions 12b and 12c is mounted on the main frame at the points 13, 14, and 15, with resilient cushions being interposed between the two frames. The front wheels 16 are each mounted in a suitable manner, for example, by means of an upper, shorter bracket 17 and a lower, longer bracket 18 and resiliently supported relative to the auxiliary frame or crossbar 12 by a helical spring 19. The brackets 17 and 18 are mounted on the ends of the U-shaped auxiliary crossbar 12 so as to be pivotable about substantially horizontal axes relative thereto and to maintain the wheel 16 in a substantially vertical position. The center 20 of the wheel then moves approximately within a vertical transverse plane 21 of the automobile passing near or substantially through the centers of the rubber cushions 14 and 15.

The front end of the engine 22 indicated in dot-and-dash lines is also supported by the auxiliary frame or crossbar 12 approximately within the plane 21 by means of rubber cushions 23 and 24, while the rear end of the engine is mounted, preferably resiliently, directly on the superstructure formed, for example, by the main frame in a manner not shown in the drawings. The front end of the crossbar 12 is mounted at 13 on the cross member 11 in the manner shown in detail in Fig. 3 by means of a tie bolt 25 passing through both the cross member 11 and the upper part of the auxiliary crossbar 12. For securing the upper end of the bolt 25 to the cross member 11, the latter carries a pair of washers 26 and 27 each having spherical convex surface 28 and 29 abutting against and resting within a corresponding concave surface on the member 11 and clamped between a flange 30 on the bolt 25 and a nut 31 on the free end of the bolt 25.

For securing the tie bolt 25 to the crossbar 12, the latter is provided with a socket like portion 40 within which an annular rubber cushion 32 is seated into which, in turn, a cup-shaped washer 39 is fitted covered by an annular spring plate 36, preferably welded thereto. On the flat lower side 34 of the portion 40 of the crossbar 12 rests an annular rubber cushion 33 loosely surrounding the tie bolt 25 and seated on a plate or washer 35. The spring cushion assembly is resiliently compressed and secured to the tie bolt 25 by means of nuts 38 and 37 acting upon the outer surfaces of the plates 35 and 36. Whereas the upper cushion 32 is firmly seated in a radial direction between the cup-shaped elements 39 and 40 so as to be resilient primarily in an axial direction of the tie bolt 25, the lower cushion 33 is designed to permit resilient but relatively free radial movement of the lower end of the tie bolt 25, i.e., the cushion 33 resiliently opposes axial movement of bolt 25 upwardly but permits the lower end of the bolt 25 to move transversely since the cushion 33 is unobstructed at either of its inner or outer radial surfaces, it being engaged only at its ends.

Figure 4:
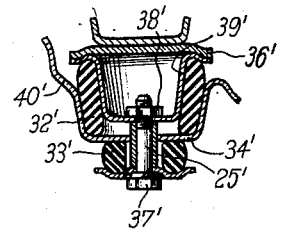
Fig. 4 shows an enlarged vertical section through one embodiment of the resilient mounting according to the invention, applicable either to the front or rear of the auxiliary frame as shown in Figs. 1 and 2.

The rear suspension mountings 14 and 15 of the auxiliary crossbar 12, one of which is shown in a vertical section in Fig. 4, are substantially similar to the front mounting as shown in Fig. 3 and elements similar to those in Fig. 3 are given the corresponding primed reference numerals. The rear suspensions 14 and 15 differ from the front suspension primarily by not being adjustable. The tie bolt 25' primarly serves for securing the rubber cushions 32' and 33' by nuts 37' and 38' to the wall portions 34' and 40' of the crossbar 12, while the cup-shaped member 39' with the flange or washer 36' is mounted directly on the long-channel bars 10 of the main frame, for example, by being welded thereto.

As illustrated in the drawings, the rubber cushions 32 and 32' have a relatively great axial length as compared with their small radial thickness. As a result of being radially calmped between the walls 39 and 40 or 39' and 40', respectively, the rubber cushions 32 and 32' have a relatively small resilience in a horizontal plane. However, in a vertical direction the rubber cushions 32 and 32' allow the parts 39 and 34 or 39' and 34', respectively, and thus the entire crossbar 12, to move over a comparatively large distance relative to the main frame. The particular cooperation of the cushions 32 and 32' and the metallic surfaces between which they are clamped permits the cushions during such vertical movement to yield adequately in a radial direction so as to furnish the proper resilience without danger of undue compression of the cushions. The lower cushions 33 or 33', respectively, are provided primarily for the purpose of maintaining the respective parts under tension. Otherwise, cushions 33 and 33' would be able to yield relatively easily in all directions. The resilience of the entire suspension of the auxiliary crossbar 12 in a vertical direction is preferably proportioned so as to be approximately three to six times that in a horizontal direction.

For adjusting the caster angle α of the wheels, the auxiliary frame or crossbar 12 may be pivoted at 13 in the direction shown by the arrow p. For this purpose the nuts 37 and 38 may be screwed either upwardly or downwardly an equal distance on the screw threads of the tie bolt 25 whereby the distance between the front end of the crossbar 12 from the cross member 11 of the main frame may be either increased or reduced. The crossbar 12 then pivots relative to the vehicle superstructure about an axis lying approximately within the plane 21 which is determined by the centers of the rear suspensions 14 and 15. The caster angle α of the wheel then adjusts itself a corresponding amount. The position of the wheels and the engine in a vertical direction relative to the main frame will not be affected thereby or only to an insignificant extent.

Figure 5:
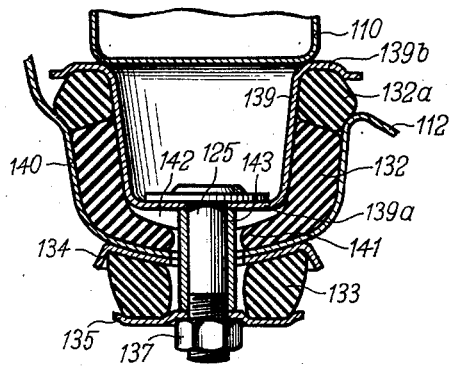
Fig. 5 shows an enlarged vertical section through another embodiment of the resilient mounting according to the present invention, similar to Figure 4.

Fig. 5 illustrates a modification of the resilient suspension of either the front or rear of the auxiliary frame 112 on the main frame of an automobile. In this case, the cross member 110 of the main frame has welded thereto an inner conical bell-shaped part 139 reducing toward its lower bottom 139a. The auxiliary frame 112, on the other hand, has an outer bell-shaped part 140 concentrically with, spaced from, and enclosing the part 139, both parts 139 and 140 acting as reinforcements of the main and auxiliary frame members 110 and 112. A rubber cushion 132 substantially of a shape of a hollow truncated cone of a material of relatively low resilience is interposed between the bell-shaped parts 139 and 140 so as to fill out tightly the intervening annular space. The lower end of cushion 132 has an inwardly extending flange 141, the thickness of which gradually reduces toward its central aperture. Thus, a free space 142 of substantially conical shape is formed intermediate the upper surface of the flange 141 and the lower surface of the bottom 139a of the part 139. The upper end surface of the rubber cushion 132 has superimposed thereon a rubber ring 132a which preferably consists of a material of relatively great flexibility and is mounted in the space between the parts 139 and 140 so as to fit tightly against the outwardly extending flange 139b at the upper end of the part 139 but otherwise to be freely extendable in a radially outward direction.

A bolt 125 is inserted from above into a central bore in the parts 139 and 140 and surrounded by a sleeve 143 which may either be a separate element or form an extension of the bottom 139a of the part 139.

The outside of the bell-shaped part 140 carries at its lower end a further rubber ring 133 interposed between suitably shaped washers 134 and 135. Ring 133 preferably consists of a material similar to that of the ring 132a and is secured in position on the bolt 125 or the sleeve 143 thereon by means of the nut 137. The sleeve 143 may in such a case be made of a length so as to permit the ring 133 as well as the rings 132 and 132a to be under a suitable tension.

By clamping the rubber cushion 132 between the bell-shaped walls 139 and 140 both parts 110 and 112 are securely maintained in position in a vertical direction relative to each other, the parts 139 and 140 taking up the forces acting in a horizontal direction with a relatively small yield. On the other hand, in a vertical direction, the rubber rings 132a and 133 allow a comparatively large resilient movement, since both rings 132a and 133 are of relatively soft material and thus may expand freely in a radially outward direction when the parts 110 and 112 move resiliently toward each other. Such resilient vertical moveability is further improved by the chamber 142 forming an air cushion between the bottom 139a of the upper part 139 and the flange 141 of the rubber cushion 132, but still allowing a certain amount of play between these parts. However, under hard impacts or shocks and strong upward movements of the auxiliary frame 112 relative to the main frame 111, the rubber layer 141 presses with a progressively increasing resistance against the lower surface of the bottom 139a of the bell-shaped part 139.

Thus, the harder, radially clamped rubber cushion is primarily used for accurately guiding the connected parts in a vertical direction while furnishing a relatively hard support in a horizontal direction, while the soft cushions take up the traveling noise of the automobile on the road as well as the small vibrations caused by the engine and the road, while simultaneously insuring a soft elasticity of the suspension in a vertical direction.

Figure 6:
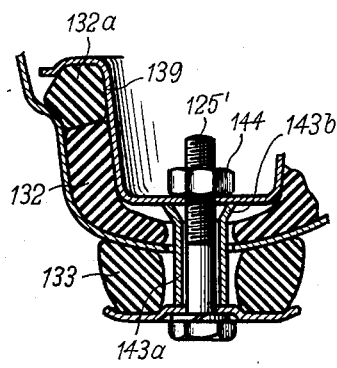
Fig. 6 shows an enlarged vertical section through still another embodiment of the resilient mounting according to the present invention, similar to Figure 4.

The embodiment of the invention shown in Fig. 6 differs from that shown in Fig. 5 merely by the fact that the bolt 125′ is screwed from below into the part 139 or into a reinforcement 144 thereon, and that the upper end of the sleeve 143a is conically extended so as to have a wider base resting on the upper bell-shaped part 139. This construction is preferable especially when the inside of the bell-shaped part 139 is not accessible from the upper side.

The suspension of the wheels at the points 17 and 18 may also be provided in a similar manner as that at the points 14 and 15, or it may be modified to any extent.

By the use of the auxiliary frame as a support for the engine or driving unit of the vehicle, and in placing the supporting points substantially within the plane of the non-adjustable mounting of the auxiliary frame, the engine will not be raised or lowered whenever the auxiliary frame is adjusted to adjust the caster of the wheels.

Moreover, the use of a substantially U-shaped or bifurcated construction of the auxiliary frame is particularly suitable for assembly in an automobile especially since it permits the wheels to be mounted at the ends of the U or fork and since it enables adjustment of the auxiliary frame to be carried out at the juncture of the arms of such U or fork.

The resilient mounting by means of rubber cushions permits, while insuring the parts to be connected to be safely and properly supported and guided in a predetermined direction, the desired resilience in the same direction to be obtained by the simplest possible means, especially by an amount of rubber far less than usually required in resilient mountings of similar types.

The use of the rubber cushions having the particular shape described above, namely the form of a rubber sleeve having a vertical axis and a great length as compared to the cross-sectional width thereof, and the particular manner of clamping such sleeves substantially within the central portion thereof between substantially cylindrical or slightly conical walls of the parts to be supported relative to each other as well as the free expansion in a radial direction of the two ends of such sleeve permits the parts to be resiliently supported relative to each other to be positively guided at the least expense in rubber and the maximum yield in a vertical direction while at the same time insuring a limited resilience in all directions.

Moreover, the particular design of the auxiliary frame and its resilient suspension affords adequate stability against lateral vibrations and movements while simultaneously effectively cushioning and absorbing the shocks and vibrations coming from the wheels thereby also permitting the engine or driving unit to be fully or partly supported upon the auxiliary frame.

The use of rubber cushions of different degrees of hardness to improve the resilient qualities of the mounting also results in a more economical utilization of the rubber material.

The term "superstructure" is used herein to designate the chassis frame or main frame of a vehicle as well as the vehicle body, for example, of a self-supporting type. Furthermore, it is understood that reference to "rubber cushions" in the specification and claims does not preclude the use of other materials having rubber-like qualities which may also be used for purposes of the present invention.

While the foregoing description sets forth in detail what we regard as the preferred embodiments of the invention, it is to be understood that numerous changes may be made therein without departing from the spirit and scope of the invention as defined in the appended claims. Thus, for example, the cushions may also be made of materials other than rubber, provided they have qualities substantially similar to rubber, and, if directly adjoining each other, they may be cemented or otherwise secured to each other.

Having thus described our invention, what we claim as new is:

1. In a vehicle the combination of a vehicle superstructure, a pair of opposite steerable wheels on different sides of said vehicle, each wheel having a generally vertical steering axis, an auxiliary frame, means for resiliently suspending said wheels on said auxiliary frame, first means for resiliently connecting said auxiliary frame to said vehicle superstructure near a vertical transverse plane passing through the central axes of said wheels, and second means for resiliently connecting said auxiliary frame to said vehicle superstructure and spaced horizontally from said first plane, said second means being adjustable for pivoting said auxiliary frame relative to said vehicle superstructure about a horizontal transverse axis passing through said first connecting means and for simultaneously therewith adjusting said wheel suspension means, whereby each steering axis is also adjusted about said transverse axis.

2. A combination with a vehicle as defined in claim 1, wherein said first and second means for resiliently connecting the auxiliary frame to said superstructure each include cushions of elastic and clamping means for pretensioning said cushions and wherein said adjusting means is so constructed as to leave pretensioning of at least the cushions of said second resilient connecting means unaffected during adjustment thereof.

3. A combination with a vehicle as defined in claim 1, wherein one of said resilient connecting means includes a substantially vertical bolt member, means for connecting said bolt member with said vehicle superstructure as well as with said auxiliary frame, and means on said bolt member for adjusting at least one of the two parts consisting of said vehicle superstructure and of said auxiliary frame with respect to the other one of said two parts.

4. A combination with a vehicle as defined in claim 1, further comprising a driving unit and means for resiliently supporting said driving unit on said auxiliary frame near said vertical transverse plane passing through the central axes of the wheels.

5. A resilient connection of two units of a motor vehicle comprising an inner bell-shaped supporting element connected with one of said units and having an outwardly directed flange at its open end, an outer bell-shaped supporting element connected with the other unit and surrounding said first element but spaced therefrom, the effective supporting surface of said second element terminating at a point short of the open end of said first element to enable radial expansion of the rubber cushion retained thereby and forming an intermediate annular space between said two elements, a first rubber cushion of a material having a relatively high degree of hardness occupying said annular space, and a second rubber cushion of a material having a relatively low degree of hardness and mounted substantially concentrically to said inner supporting element within such range within which said inner supporting element extends beyond said outer supporting element, said second cushion abutting against said flange on said inner supporting element.

6. A resilient connection as defined in claim 5, further comprising a third annular rubber cushion of a rubber material having a relatively low degree of hardness, said third cushion having an end surface abutting axially from the outside against one end surface of said outer bell-shaped supporting element, a third supporting element abutting against the other end surface of said third rubber cushion, and a connecting member passing axially through said second supporting element and connecting said first supporting element with said third supporting element.

7. A resilient connection as defined in claim 5, wherein said second rubber cushion has a projecting portion extending substantially radially therefrom at one end, said cushion being able to expand in a radial direction at said one end, said bell-shaped elements being connected to said two units, said projecting portion having axial play relative to one of said first and second elements so that said cushion will not abut against said last-mentioned one element until said two parts to be connected have moved a certain distance relative to each other.

8. A resilient connection of two units of a motor vehicle comprising an inner bell-shaped supporting element connected with one of said units and having an outwardly directed flange at its open end, an outer bell-shaped supporting element connected with the other unit and surrounding said first element but spaced therefrom, said elements having axially extending surfaces defining therebetween an annular space, a rubber cushion in said annular space, and having an end face bearing against said flange, the effective cushion supporting surface of said outer bell-shaped element terminating at one end thereof in spaced relationship to said flange to enable radial expansion of the cushion outwardly therebetween, said outer bell-shaped element having at its other end an inwardly extending surface engaged by an opposite end face of said annular cushion, said inner bell-shaped element having an inwardly extending surface spaced from last-mentioned surface and defining therebetween a space into which said rubber cushion may expand, a clamping element spaced from said inwardly extending surface of said outer bell, and an annular cushion between said outer bell and said clamping element and held in compression therebetween, and means extending axially through said outer bell element to connect said inner bell and said clamping element to hold said cushions in compression.

References Cited in the file of this patent
UNITED STATES PATENTS

| | | |
|---|---|---|
| 1,833,424 | Jansson | Nov. 24, 1931 |
| 2,037,033 | Lord | Apr. 14, 1936 |
| 2,514,811 | Stephenson et al. | July 11, 1950 |
| 2,642,252 | Pietz | June 16, 1953 |
| 2,708,003 | Nallinger | May 10, 1955 |

FOREIGN PATENTS

| | | |
|---|---|---|
| 662,538 | Great Britain | Dec. 5, 1951 |
| 677,861 | Great Britain | Aug. 20, 1952 |
| 706,558 | Great Britain | Mar. 31, 1954 |